United States Patent [19]
Müller

[11] Patent Number: 5,933,287
[45] Date of Patent: Aug. 3, 1999

[54] OPTICAL ARRANGEMENT HAVING A MAGNETIC HOLDING DEVICE

[75] Inventor: Roland Müller, Aalen, Germany

[73] Assignee: Carl Zeiss-Stiftung, Germany

[21] Appl. No.: 09/114,034

[22] Filed: Jul. 10, 1998

[30] Foreign Application Priority Data

Jul. 11, 1997 [DE] Germany .................. 297 12 274 U

[51] Int. Cl.⁶ .......................... G02B 7/02; G02B 15/14
[52] U.S. Cl. .................................. 359/819; 359/703
[58] Field of Search .............................. 359/819, 703, 359/704

[56] References Cited

U.S. PATENT DOCUMENTS 5,778,133 7/1998 Plesko .................................. 385/146

FOREIGN PATENT DOCUMENTS 124 447 2/1977 Germany .

Primary Examiner—Georgia Epps
Assistant Examiner—Ricky Mack

[57] ABSTRACT

The invention relates to an arrangement with optical elements, in which a first housing portion with optical elements is releasably held to a second housing portion with optical elements. A magnetic holding device is installed between the first housing portion and the second housing portion to releasably hold the first housing portion to the second housing portion.

9 Claims, 1 Drawing Sheet

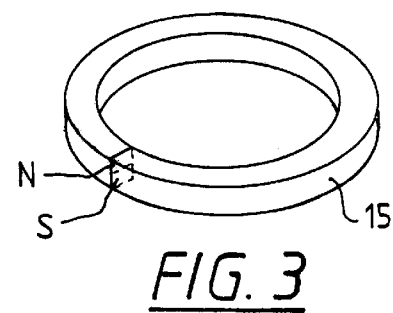
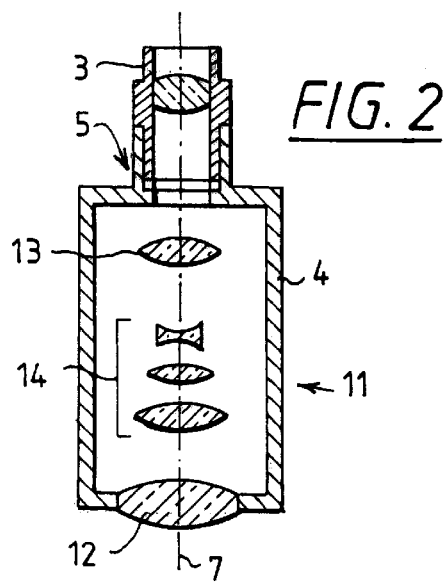
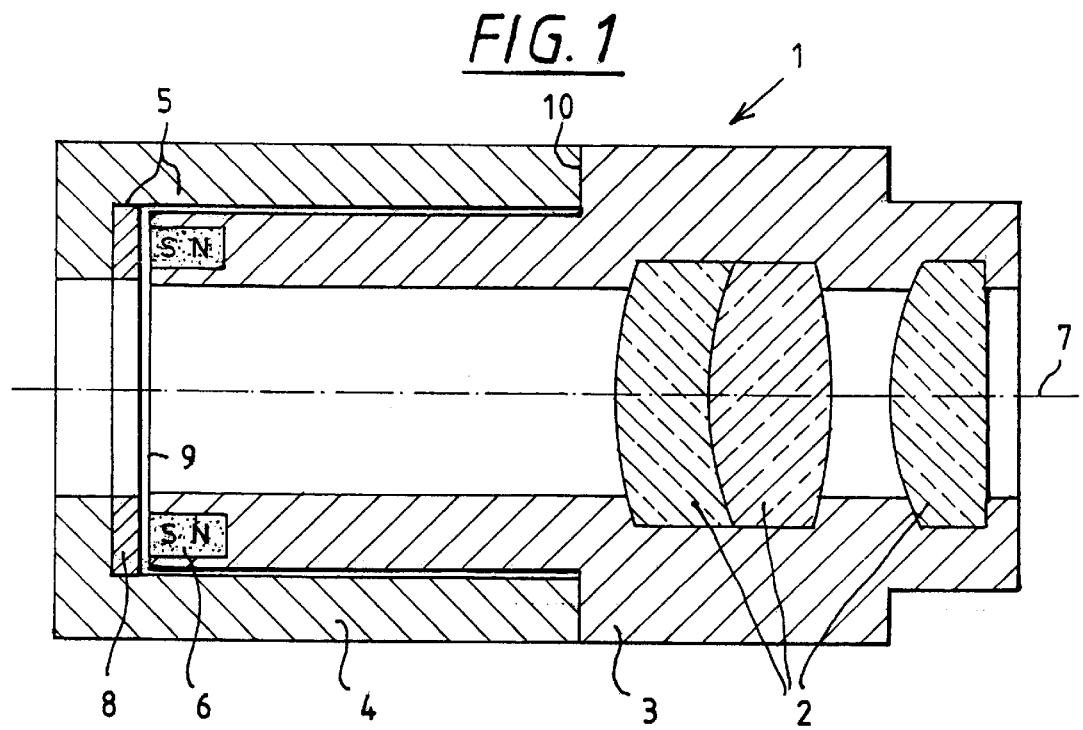
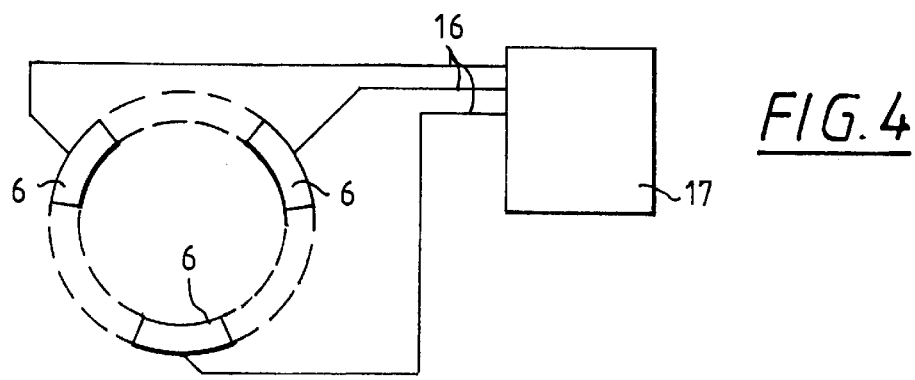

OPTICAL ARRANGEMENT HAVING A MAGNETIC HOLDING DEVICE

BACKGROUND OF THE INVENTION

Field of the Invention

The invention relates to an arrangement with optical elements, and more particularly to an arrangement in which a first housing portion with optical elements is releasably held to a second housing portion with optical elements.

Such optical arrangements have been known for a long time. Here, substantially, the essential thing is that a first housing portion is attached to a second housing portion such that the first housing portion is prevented from falling out of the second housing portion.

This takes place by various techniques in the known devices. Thus it is known, firstly, that eyepieces are screwed onto a tube of an operation microscope by means of a threaded ring, or are held on the eyepiece seating of microscopes by slide-hindering fictional bodies. For microscopes, locking screws as releasable fasten means are also known.

An adjustable eyepiece for endoscopes is known from East German Patent DD 124,447, in which a movable eyepiece portion is held in an eyepiece seating by means of a spring. The movable eyepiece portion of the eyepiece housing is of ferromagnetic material. It is not stated in DD 124,447 how the eyepiece housing itself is connected to the rest of the endoscope.

The eyepiece housing has an eyepiece funnel onto which a camera adapter can be clamped. This camera adapter has a magnet that can pull the movable eyepiece portion to itself axially in the optical axis against the force of the holding spring. If the adapter is removed, the holding spring drives the movable eyepiece portion back again into a basic position to the eyepiece housing.

SUMMARY OF THE INVENTION

The object of the invention is to hold together, easily releasable by hand, two housing portions that have optical elements and are releasably held together.

This object is achieved by an arrangement with optical elements, comprising a first housing portion with optical elements, a second housing portion with optical elements, and a magnetic holding device between the first housing portion and the second housing housing portion that releasable holds the first housing portion to the second housing portion.

The optical arrangement according to the invention has optical elements of which a portion is accommodated in a first housing portion and the other portion of tie optical elements is accommodated ill a second housing portion. The two housing portions are releasably held together.

According to the invention, a magnetic holding device is installed between the first housing portion and the second housing portion. This magnetic holding device, on the one hand, secures the two housing portions against an inadvertent release (so that the first housing portion is not inadvertently separated from die second housing portion), and on the other hand insures that the two housing portions are easily separated from each other by hand without needing great effort, and without requiring tools.

The magnetic holding device is preferably constructed from a magnet or magnet ring and a soft iron material that faces it, or two mutually facing magnets wherein the attracting poles of the two magnets face each other.

It can also preferably be constructed from round magnets or at least two magnet segments that are arranged at spacings on a ring, which spacings are nearly equal.

In order to arrange an even easier releasing of the two housing portions as needed, the holding force of die magnetic holding device can be made variable. This can be very easily effected if the air gap between the magnet(s) and the facing soft iron material is variable (e.g., adjustable), or if a greater holding force is produced by an electromagnet in addition to the minimal holding force. The whole holding force could of course also be produced by one or more electromagnets only.

The optical arrangement is preferably built into a microscope; in particular, into an operation microscope, which offers the greatest advantage.

According to the design of the magnetic holding device, the two housing portions can at the same time be rotatably held.

BRIEF DESCRIPTION OF THE DRAWING

The invention will be described in more detail with reference to the accompanying Figures, wherein FIG. 1 is a schematic sectional view of a holding device according to the invention;

FIG. 2 is a schematic sectional view of an operation microscope comprising a holding device according to the invention;

FIG. 3 is a perspective view of a magnetic ring of a further holding device according to the invention;

FIG. 4 is a schematic view of a further magnetic holding device, according to the invention, which can exert a variable holding force.

The following description does not limit the character of the invention and contains advantageous embodiments of the invention.

DETAILED DESCRIPTION OF PREFERRED EMBODIMENTS

FIG. 1 is a sectional view of an optical arrangement (1), according to the invention, which comprises a first housing portion (3) with optical elements (2) and a second housing portion (4) with further optical elements (not shown in FIG. 1). The optical arrangement (1) may be incorporated in any optical device which has portions to be releaseably connected together. One example of such an optical device is an operation microscope or surgical microscope, as will be shown in FIG. 2.

The housing portions (3, 4) are releaseably connected together by means of a magnetic holding device (5). The magnetic holding device includes firstly several magnets (6; in this sectional view only two of three magnets are shown), which are installed at equal spacings in the eyepiece housing, about the optical axis (7).

The surface (8) of the second housing portion (4), which faces the magnets (6) comprises a ferromagnetic material. The second housing portion may consist of a non-magnetic material (e.g., plastic, aluminum, etc.). The magnets (6) used are round magnets of a permanent magnetic material, and in the example shown die magnetic south pole faces the other housing portion (4).

The magnetic holding device (5) on the one hand secures the two housing portions (3, 4) against inadvertent release (so that the first housing portion (3) cannot inadvertently fall out of the second housing portion (4)), and on the other hand insures that the two housing portions (3, 4) can easily be separated by hand without requiring a great exertion or the use of tools.

The magnets (6) are not directly in contact with the facing surfaces (8). There is an air gap (9) between the two surfaces (6, 8). This air gap (9) is produced by a seating (10) of the first housing portion (3) on the second housing portion (4), and has the effect that the two housing portion (3, 4) do not "stick together" too strongly, and are therefore relatively easy to mutually separate by hand. The holding force can be established very exactly by die selection and dimensioning of the magnets (6) and also by the selection of the material of the facing surface (8).

In order to insure a rotationally correct orientation of the first housing portion (3) in the second housing portion (4), either a mechanical guide (groove and ridge) can be provided (which however does not itself have to exert a holding force between the two housing portions (3, 4)), or else a positionally correct mutual alignment of the two housing portions (3, 4) can be insured by the poling of the holding magnets and of the magnets arranged facing them (magnet segments are preferred here).

FIG. 2 shows a sectional view of a surgical microscope (11) comprising the optical arrangement (1 of FIG. 1). Here the first housing portion (3) is all eyepiece housing portion and the second housing portion (4) constitutes the microscope body which encompasses an objective lens (12), a zoom or pancratic system (14) and a relay lens (13) centered on the optical axis (7) respectively.

FIG. 3 shows a perspective view of a magnetic ring (15), which could replace the magnets (6) in the optical arrangement (1 of FIG. 1). As schematically depicted in FIG. 3, the south pole as well as the north pole of the magnetic ring (15) extend along its whole circumference and are separated in an axial direction.

FIG. 4 shows in a schematic axial view tie magnets (6) which are arranged on an imagined ring (dashed lines in FIG. 4) at substantially equal spacings around the optical axis. These magnets (6) comprise an electromagnet (coil body) respectively connected by lines (16) to a control unit (17) controlling the magnetic force of the electromagnets whereby the holding force can be varied.

By means of the control unit (17) the holding force can not only be increased or decreased, but also be inverted to become a repelling force. Thereby, releasing the two housing portions could be made particularly easy. When electromagnets and permanent magnets are combined together a minimal holding force provided by the permanent magnets alone makes releasing the two housing portions easy when the electromagnets switched off by the control unit (17).

I claim:

1. An optical instrument, comprising:

an instrument body (4) with optical elements (12), an instrument portion (3) with optical elements (2), said instrument portion (3) being operationally detachable from said instrument body (4), and a magnetic holding device (5) between said instrument body (4) and said instrument portion (3) that releasably holds said instrument portion (3) to said instrument body (4).

2. The optical arrangement according to claim 1, in which said magnetic holding device (5) comprises a magnet (6) and a soft iron material (8) that faces said magnet (6).

3. The optical arrangement according to claim 1, in which said magnetic holding device (5) comprises two magnets with attracting poles facing each other.

4. The optical arrangement according to claim 1, in which said magnetic holding device (5) comprises at least one magnet ring.

5. The optical arrangement according to claim 1, in which said magnetic holding device (5) comprises at least three magnet segments spaced from each other on a ring.

6. The optical arrangement according to claim 5, in which said magnet segments are equally spaced from each other.

7. The optical arrangement according to claim 1, in which said magnetic holding device (5) exerts a variable holding force.

8. The optical instrument according to claim 1, in which said instrument portion (3) comprises an eyepiece.

9. The optical instrument according to claim 1, in which said optical instrument comprises a microscope.

* * * * *